Figure 1:
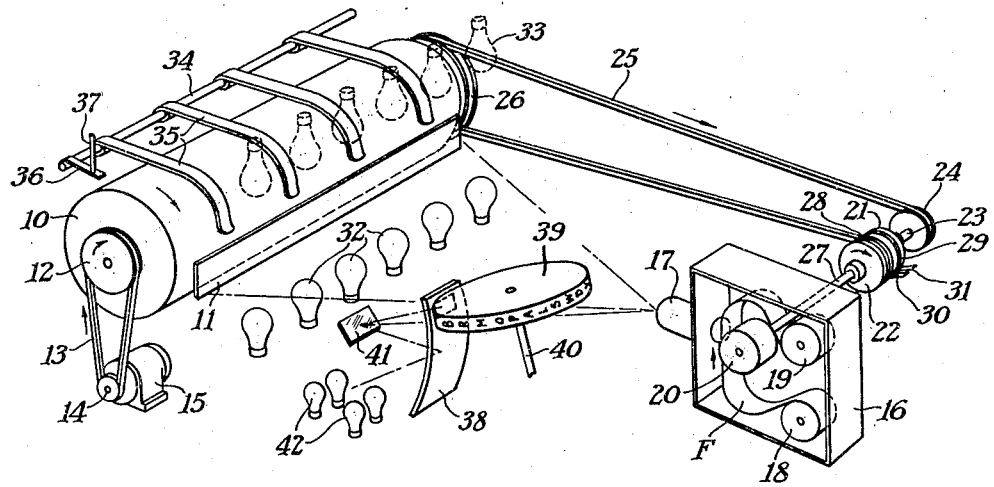

July 9, 1946.   J. F. EGAN   2,403,711
CONTROL FOR PHOTOGRAPHIC COPYING APPARATUS
Filed Oct. 27, 1943

JOHN F. EGAN
INVENTOR

BY
ATTORNEYS

Patented July 9, 1946

2,403,711

UNITED STATES PATENT OFFICE 2,403,711

CONTROL FOR PHOTOGRAPHIC COPYING APPARATUS

John F. Egan, Rochester, N. Y., assignor to Eastman Kodak Company, Rochester, N. Y., a corporation of New Jersey Application October 27, 1943, Serial No. 507,793

18 Claims. (Cl. 88—24)

The present invention relates to a control for photographic copying apparatus and, more particularly, to an electrical control for a photographic copying apparatus in which the document and sensitized material are moved continuously and in which a document operated or a control member is spaced from the copy or document field.

As is well known, in continuous photographic copying machines, the document-controlled member for controlling film movement and document illumination should not be in the copy or document field because such controlled member may be photographed and obscure or cause underexposure of a portion of the document. Consequently it is general practice to space such document-operated or controlled member some distance from the copy or document field and this requires some delayed action means between the document-controlled member and the film drive so that movement of the film is initiated just as the leading edge of the document enters the document field and is interrupted just as the trailing edge of the document leaves the document field. It is also desirable and common practice to have the document illuminating means controlled in the same manner. Heretofore, such delayed action means has been of a mechanical type with consequent complication and expense in construction and maintenance. Furthermore, such mechanical delayed action means has not been as capable of regulation or adjustment as has been found to be the case with the control means of the invention.

The primary object of the invention is the provision of a delayed action control means for a photographic copying apparatus having a document field and a photographic field, and including a timing control means responsive to the presence of a document in said document field and for controlling film advancing means and document illuminating means so that they become effective just as the leading edge of a document enters the document field and are rendered inoperative just as the trailing edge of the document leaves said document field.

Another object of the invention is the provision of a timing control means including an electrical condenser which has a charging rate corresponding to the interval required for the leading edge of a document to move from engagement with the controlled member to the leading edge of the document field and having a discharging rate corresponding to the interval required for the trailing edge of the document to move from engagement with the control member past the trailing edge of the document field.

A further object of the invention is the provision of a timing control means comprising a timing circuit including a delayed action means and for supervising the operation and inoperativeness of a film advancing means or a film drive control circuit.

Still another object of the invention is the provision of a control means comprising a timing control circuit including a delayed action means and an illumination control means supervised by said time control circuit.

A still further object of the invention is the provision of a timing control circuit including an electrical condenser and a document-operated switch whereby engagement of a document with a control member connects an electrical condenser for charging, and disengagement of the document from the control member connects said electrical condenser for discharge.

Another object of the invention is the provision of a timing control circuit including an electrical condenser and a charging resistance, which resistance is short-circuited after a predetermined charging of the condenser, so that the condenser is fully charged to begin its discharge and its discharging characteristic is uniform.

A further object of the invention is the provision of a preliminary illuminating circuit for heating one or more light sources of an illuminating means during the interval for the leading edge of a document to move the leading edge of the document field, whereupon said preliminary illuminating circuit is shunted and said light sources are fully energized.

Still another object of the invention is the provision in a timing control means of an intermediate circuit between the timing control circuit and illuminating control circuit, so that interruption of the illuminating control circuit is delayed and the clutch assembly of the film advancing means is disengaged.

Other and further objects of the invention will be suggested to those skilled in the art by the disclosure which follows.

The aforementioned and other objects of the invention are embodied in a control means including a timing circuit, a film drive control circuit and illumination-control means including a preliminary illuminating circuit and a main illumination control circuit. Said timing control circuit includes a delayed action means such as an electrical condenser, and a document-operated switch for rendering the timing circuit effective after proper intervals for operation and interruption of the film driving means. When said delayed action means is in the form of an electrical condenser the timing control circuit may also include a relay coil in parallel with said condenser, a charging resistance and a discharging resistance for determining the charging and discharging rates of the condenser and/or a shunt circuit for shorting the charging resistance after the relay coil is energized. Said film drive control circuit may include a solenoid adapted when energized to render the clutch assembly of a film advancing means operative and a relay switch operated by the relay coil of said timing control circuit. Said illumination control circuit includes the light source or light sources of an illuminating means and a switch operated by the relay coil of the timing control circuit. A preliminary illumination control circuit includes a document-operated switch and a resistance for reducing the energization of the illuminating means during the interval for the leading edge of the document to move from engagement of the control member to the leading edge of the document field. Said illumination control circuit may also include a resistance for controlling the normal brilliance of the light sources in the illuminating means and/or a shunt circuit for short-circuiting the resistance of the preliminary illumination control circuit. An intermediate means may be provided between the timing control circuit and illumination control circuit for the purpose of providing sufficient opportunity for the film drive clutch assembly to become disengaged before the illuminating means is deenergized. Although the control means of the invention is described herein with reference to a photographic copying apparatus of the continuous type, it is to be understood that such control means may be equally useful for other types of photographic copying apparatus and photographic copying apparatus used for other purposes than copying documents.

Figure 2:
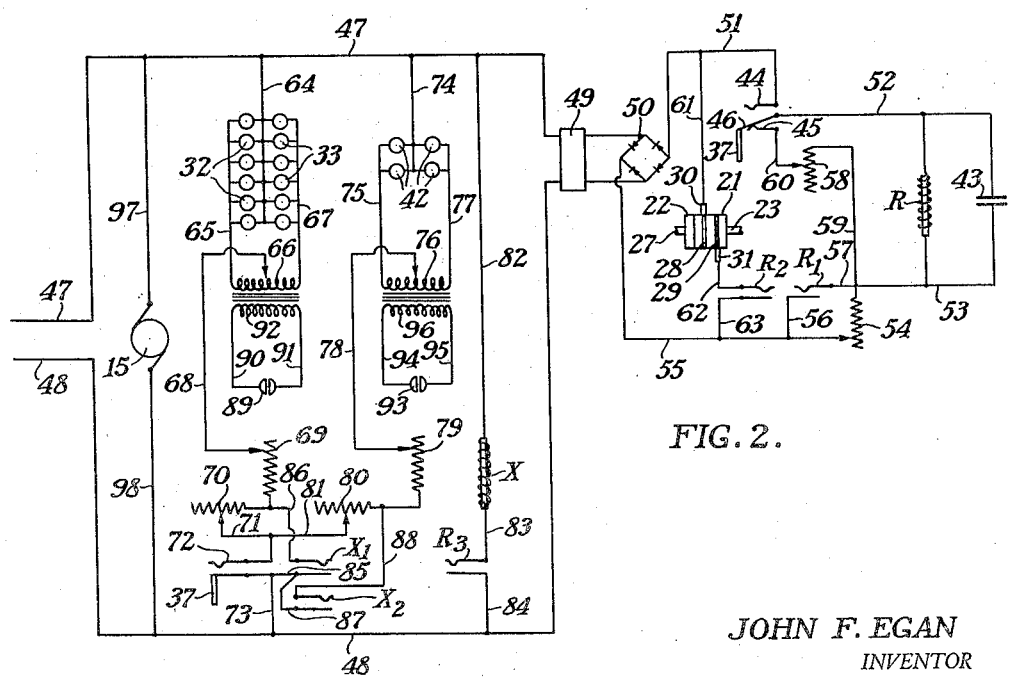

Reference is hereby made to the accompanying drawing wherein like reference characters designate similar elements and wherein:

Fig. 1 is an illustrative perspective of the various elements comprising a photographic copying apparatus; and Fig. 2 is a wiring diagram for the timing control means and various circuits thereof according to the invention.

In the illustrated embodiment the photographic copying apparatus comprises a feeding means, an advancing means, an illuminating means and a control member. An identifying assembly may be arranged to project an image of established data to the photographic field of the copying camera. The term "copy field" as used herein broadly covers the document field through which the document is moved by the feeding means and the field of the indicia of the identifying assembly, and the term "document field," except as the context otherwise permits, relates to that portion of the copy field through which a document is being moved.

The feeding means of the photographic copying machine may be provided in any of several ways, such as a rotating drum or a plurality of pairs of spaced rollers. As illustrated, the feeding means comprises a drum 10 rotatably mounted and for moving a document engaging the periphery thereof past a transparent strip 11. The transparent strip 11 or an equivalent masking aperture may be considered the document field of the apparatus. Said drum 10 may be rotatably driven in any convenient manner, and is shown as carrying a pulley 12 encircled by a belt 13 which also encircles a pulley 14 on the shaft of an electrical motor 15.

The advancing means of the copying apparatus is arranged to operate in synchronism with the feeding means and is for the purpose of moving a film through the photographic field of the apparatus or gate of the copying camera. As diagrammatically illustrated in Fig. 1, the copying camera comprises a casing 16 carrying an objective 17 and enclosing a supply film roll 18, a take-up film roll 19 and a driving roller 20. The film F is conducted in a known manner from the supply film roll 18 over the driving roller 20 and through the focal plane of objective 17 to the take-up film roll 19. Said advancing means also includes a clutch assembly having a driving member 21 and a driven member 22. Said clutch driving member 21 may be rotated by suitable connections and at a ratio determined by the distance between the document and photographic fields and by the reduction ratio of objective 17. For instance, clutch driving member 21 may be mounted upon a shaft 23 carrying a small diameter pulley 24 which is encircled by a belt 25 also encircling a large diameter pulley 26 on the other end of drum 10. The driven member 22 of the clutch assembly is arranged to move the film F through the copying camera as by a shaft 27 connected to driving roller 20. The clutch assembly of the advancing means is preferably arranged to be moved into and out of engagement according to the energization or deenergization of a solenoid. Such an arrangement is conveniently obtained by use of a magnetic clutch of standard design and which may include in its driving member 21 a solenoid, not shown, but energized through slip rings 28 and 29 contacted respectively by brushes 30 and 31.

The illuminating means of the photographic copying machine may also be arranged in a known manner and includes one or more light sources preferably of incandescent lamps and one or more reflectors, not shown, for directing and distributing the light in the document field. As shown, said light sources are provided in two banks, one a row of incandescent lamps 32 located below and in front of the document field, and the other bank being a row of incandescent lamps 33 arranged above and in front of the document field. The location and arrangement of such light sources may be varied as desired or required for proper illumination of the document field or of a document being moved by drum 10 past transparent strip 11.

The document-operated control member, as previously explained, is spaced from the document field so as not to interfere with the photographic copying process. Such a control member may also be constructed or designed in any convenient manner and its specific form may be determined in large part by the type of feeding means used. For a drum type feeding means the control member may comprise a rod 34 rotatably mounted, carrying a plurality of document engaging fingers 35 which normally contact the periphery of drum 10 but are displaced by the leading edge of a document being moved by said drum 10, and said control member includes an arm 36 on said rod 34 for operating a switch plunger 37. Those skilled in the art will recognize that the control member shown and contemplated by the invention is responsive to the presence of a document in the feeding means and is spaced from the document field. Said control member is operated to one position by engagement of the leading edge of a document therewith, and returns to another position upon disengagement of the trailing edge of the document from the control member.

The photographic copying apparatus may be provided with an identifying assembly of the type more comprehensively illustrated and described in Hopkins U. S. Patent 1,987,064, granted January 8, 1935. Such an identifying assembly has indicia provided on a stationary arcuate support 38 and/or on the periphery of a drum 39 mounted upon a shaft 40. A rotating mirror 41 is driven in a readily understood manner, not shown, by the driven member of said clutch assembly and directs a moving image of the stationary indicia of the identifying assembly into the photographic field or onto the film of the copying camera. The illuminating means also includes one or more light sources for illumination of said indicia and preferably includes a plurality of incandescent lamps 42 arranged for proper and even illumination of the indicia of the identifying assembly. The same light source or light sources may illuminate both the document field and indicia of the identifying assembly, but more effective control of illumination is obtained by separate provision of such light sources in the manner shown herein.

It is well recognized that accurate control of the film drive by the document in a photographic copying machine is absolutely necessary, because otherwise there may be large and uneven spaces between images on the microfilm or there may be overlapping of the document images on the film. Nor is it feasible to place the control member at the very edge of the document field because the document-engaged members of such control member will effect the photographing of the document. Heretofore, the intervals required between engagement or disengagement of the document with the controlled member and start or interruption of the film drive have been obtained by comparatively complicated mechanical constructions which are difficult to adjust for precise timing and which are subject to wear to affect the time intervals. The rate of document movement required in photographic copying machines renders said intervals very small and in the order of a fraction of a second, which fact further increases the difficulties of providing a satisfactory mechanical control. The basic concept of the invention is the provision of electrical delayed action means which can very readily time to small fractions of a second, which are uniform in operation, relatively easy to adjust, and not subject to wear sufficient to affect their function. Such electrical delayed-action means may be provided in any of several forms, such as interval timers, thermostatic switches, etc. But, preferably, according to the invention, the electrical delayed-action means is provided in the form of an electrical condenser. As will be explained hereinafter, the charging rate and discharging rate of such an electrical condenser determine the leading and trailing intervals required and it is well known that such charging and discharging rates of a condenser have fixed and uniform characteristics and can be easily varied as by the provision of appropriate rsistances.

The timing control means, according to the invention, preferably comprises a circuit responsive to movement of the control member engaged and disengaged by the document and which timing control circuit determines operation and interruption of film drive by the advancing means and/or energization or deenergization of the document illuminating control means. As already indicated, such timing control circuit preferably includes an electrical condenser 43. A document-operated switch of single pole, double throw type has switch terminals 44 and 45 and a switch arm 46 arranged to be engaged by the switch plunger 37 of the control member. Said document-operated switch is normally in the position shown in Fig. 2 with switch arm 46 in contact with switch terminal 45. An electrical supply line has legs 47 and 48 connected to a constant voltage transformer 49 which is in turn connected to a rectifier 50 preferably of the selenium type. A wire 51 extends from one output terminal of rectifier 50 to switch terminal 44 and a wire 52 extends from switch arm 46 to one side of condenser 43. The other side of condenser 43 is connected by a wire 53 to one side of a variable resistance 54, and the other side of said resistance 54 is connected by a wire 55 to the other output terminal of the rectifier 50. The use of a constant voltage transformer and rectifier as the source of direct current is optional, but most reliable operation of the timing control circuit will be obtained by the use of a uni-directional constant voltage current as provided thereby.

A master relay coil R is connected across wires 52 and 53 and in parallel with said electrical condenser 43. Said relay coil R when energized operates a plurality of switches, $R_1$, $R_2$ and $R_3$, but, separate relay coils and switches would be the equivalent thereof. A shunt circuit for short circuiting variable resistance 54 comprises a wire 56 connected between wire 55 from the rectifier 50 and one side of relay switch $R_1$ and a wire 57 connected between the other side of relay switch $R_1$ and wire 53 leading to the condenser 43. A second variable resistance 58 has one side connected by a wire 59 to said wire 53 leading to the condenser 43 and has its other side connected by a wire 60 to the switch terminal 45 of the document-operated switch.

The operation of the timing control circuit is as follows: When a document engages the fingers 35 of the control member, rod 34 and arm 36 are rotated to move plunger 37 which in turn moves the switch arm 46 of the document-operated switch into contact with switch terminal 44. This places the condenser 43 across the supply line and such circuit extends from leg 47 through transformer 49 and rectifier 50, through wire 51, switch terminal 44, switch arm 46, wire 52, condenser 43, wire 53, variable resistance 54, wire 55 and again through rectifier 50 and transformer 49 and to leg 48 of the supply line. Thus the condenser 43 is charged at a rate determined by the capacity of the condenser, the value of resistance 54 and/or voltage across the output terminals of rectifier 50. Obviously, such charging rate can be changed by variation of any of the aforementioned factors. That can be very effectively and conveniently done merely by changing the value of said variable resistance 54. The voltage drop across wires 52 and 53 on account of the charging of condenser 43 will be reduced or maintained below the critical voltage necessary to energize relay coil R, however, as condenser 43 charges said voltage drop will increase and at a predetermined time or after an interval determined by the factors of the timing control circuit, said voltage drop will be sufficient to energize relay coil R. Thus active energization of relay coil R is a relative term and hereinafter said relay coil R will be considered energized only when a voltage drop equal to or greater than its critical voltage is impressed thereon and will be considered deenergized when a voltage drop less than its critical voltage is thereacross. The charging rate of the condenser and of the timing control circuit is selected or adjusted so that the interval for the voltage drop across relay coil R to reach its critical voltage is equal to the time required for the leading edge of a document to move from engagement with the control member to the leading edge of the document field. When switch R₁ is closed the shunt circuit across variable resistance 54 is completed and condenser 43 is then placed directly across the output terminals of rectifier 50 and is fully charged always at the same voltage for a purpose to be presently explained.

When the trailing edge of a document disengages fingers 35 of the control member, the switch plunger 37 is moved so that switch arm 46 engages switch terminal 45. As a result a discharging circuit for condenser 43 is established and such circuit extends from one side of condenser 43 and through wire 52, switch arm 46, switch terminal 45, wire 60, variable resistance 58, wire 59 and wire 53 to the other side of condenser 43. Again the discharging rate of condenser 43 will be determined by the value of resistance 58, capacity of condenser 43 and/or the line voltage. Master relay coil R remains energized until such time as the voltage drop across condenser 43 and across wires 52 and 53 is below the critical energization voltage of said relay coil R. The discharging rate of condenser 43 through resistance 58 is selected or adjusted so that the interval for the voltage drop across relay coil R to reduce for effective deenergization thereof is precisely equal to the time required for the trailing edge of a document to move after disengagement from fingers 35 of the control member to and through the document field of the copying apparatus. For uniformity of this trailing interval the condenser 43 should start its discharging cycle always at the same voltage and this objective is obtained by insuring that condenser 43 is charged always to the same voltage and by the expedient of shunting the charging resistance 54 by means of relay switch R₁ and wires 56 and 57.

The film drive control circuit is arranged to be completed upon energization of relay coil R and to be interrupted by deenergization thereof. Such film drive control circuit comprises a wire 61 connected between wire 51 and brush 30 of the magnetic clutch assembly, a wire 62 extending from brush 31 to one side of relay switch R₂ and a wire 63 extending from the other side of relay switch R₂ to wire 55. Clutch members 21 and 22 are normally disengaged, but upon energization of the solenoid of the magnetic clutch or magnetically operated clutch, said clutch members 21 and 22 are engaged and the film-advancing means becomes operative. When relay coil R is energized by the condenser charging cycle previously described, relay switch R₂ is closed and the solenoid for operating the clutch assembly of the advancing means is also energized. Conversely, when relay coil R is deenergized, relay switch R₂ is opened, the film drive circuit is opened and the solenoid for operating the clutch assembly is deenergized. Thus energization and deenergization of relay coil R directly controls the operativeness and inoperativeness of the clutch assembly of the film advancing means.

The illuminating control means preferably comprises a plurality of circuits, one for heating the light sources during the leading interval, another for energizing the light sources to normal brilliance, and the other for delaying the deenergization of the light sources until after the clutch assembly of the advancing means has had an opportunity to disengage.

The preliminary illuminating circuit is for preheating the filaments of the incandescent lamps 32, 35 and 42, so that such lamps will attain full brilliance almost immediately when the leading edge of the document reaches the document field. It is not always possible to fully energize the light sources during the leading interval because reflections within the copying apparatus, from the document drum or identifying assembly, may expose or fog the film in the gate of the copying camera. Thus the light sources are preferably energized during said leading interval below incandescence and so that no actinic light will be reflected onto the film F before it is moved by operation of the advancing means. Said preliminary illuminating-control circuit comprises primarily a document-operated switch and a variable resistance, and the main illuminating-control circuit comprises a pair of relay-operated switches closed by a relay coil in an intermediate circuit. The preliminary and main illuminating-control circuits include in common the light sources and a resistance for controlling their full brilliance.

The lamps 32 and 33 are arranged in parallel with a common wire 64 leading thereto. A wire 65 leads from one side of lamps 32 to one side of a transformer winding 66. A wire 67 leads from the other side of lamps 33 to the other side of said transformer winding 66. A wire 68 is connected to a center tap of transformer winding 66 and to one side of a variable resistance 69. The preliminary illuminating circuit extends from said variable resistance 69 through a second variable resistance 70, a wire 71, a document-operated switch 72 and common wire 73 to the leg 48 of the supply line. In a similar manner the lamps 42 for illuminating the indicia of the identifying assembly are arranged in parallel. A wire 74 is connected to one side of all the lamps 42. A wire 75 leads from one side of one bank of lamps 42 to one end of a transformer winding 76. A wire 77 extends from the other side of the other half of lamps 42 to the other end of transformer winding 76. A wire 78 has one end connected to the center tap of transformer winding 76 and its other end connected to the variable resistance 79. For the preliminary illumination circuit for the identifying assembly, variable resistance 79 is in series with a second variable resistance 80 which has its other side connected by a wire 81 and through document-operated switch 72 and common wire 73 to the leg 48 of the supply line. The effect of the series connections of variable resistances 69 and 70 and of 79 and 80 in the illuminating circuits for the document field and indicia of identifying assembly is to reduce the voltage drop on lamps 32, 33 and 42 so that they cannot give off actinic light sufficient to expose the film F in the copying camera, but these resistances in series are such that the filaments of said lamps 32, 33 and 42 are heated so that they may be energized to incandescence very rapidly.

When master relay coil R is energized, relay switch R₃ is also closed to complete an intermediate circuit, comprising a wire 82 extending from leg 47 of the supply line, a relay coil X, a wire 83, said relay-operated switch R₃ and a wire 84. Said relay coil X when energized closes relay switches X₁ and X₂. Shunt circuits extend through said relay switches X₁ and X₂ for short circuiting the heating resistances of the preliminary illuminating control circuits. One of such shunt circuits includes a wire 85, said relay switch X₁ and a wire 86 connected to one side of variable resistance 69. The other shunt circuit comprises said wire 85, a wire 87, said relay switch X₂ and a wire 88 connected to said variable resistance 79. Thus, when master relay coil R is energized after the leading interval or after the time required for the leading edge of a document to move from engagement with the control member to the leading edge of the document field, relay switch R₃ is closed, relay coil X is energized and relay switches X₁ and X₂ are closed. Under these circumstances the variable resistances 70 and 80 and the document-operated switch 72 are short circuited, so that the lamps 32, 33 and 44 are energized to full brilliance and are kept energized after opening of document-operated switch 72 or after the trailing edge of the document disengages the control member or fingers 35.

Since there is little, if any, lag in the extinction of incandescent lamps but there is generally some lag in the disengagement of a clutch assembly, an intermediate means is provided so that the illuminating means will not be extinguished while the advancing means is still moving film through the copying camera. Said intermediate means is composed of the circuit including relay coil X and introduces a slight lag between deenergization of relay coil R and the opening of switches X₁ and X₂. In fact, a standard relay in such intermediate circuit has been found sufficient but if a sluggish clutch assembly is encountered it may be necessary and is within the scope of the invention to insert an interval timer or other delayed-action means to delay the deenergization of the lamps of the illuminating circuits.

Telltale devices may be associated with the lamp banks to advise the operator of any abnormal condition therein. A neon lamp 89 is connected by wires 90 and 91 to opposite sides of a transformer winding 92 in inductive relation to the transformer winding 66. Likewise, a neon lamp 93 is connected by wires 94 and 95 to opposite ends of a transformer winding 96 which is in inductive relation to the transformer winding 76. If any of lamps 32 burns out the parallel circuits including the banks of lamps 32 and 33 will be unbalanced and a current induced in winding 92 so that neon lamp 89 is lighted. Likewise, if any of lamps 42 burns out the parallel circuits are unbalanced and neon lamp 93 will be lighted by reason of the unbalanced condition inducing a current in transformer winding 96. The provision of these telltale devices is entirely optional.

The motor 15 for driving the feeding means is connected across the legs 47 and 48 of the supply line by wires 97 and 98. Thus the feeding means or drum 10 is operative at all times to move a document inserted thereinto. When the leading edge of a document raises fingers 35, the document-operated switch is moved to connect the timing control circuit for charging condenser 43. Relay coil R is not critically energized until after the leading interval or the time required for the leading edge of said document to reach the leading edge of the document field and the duration of this leading interval may be varied in the manner indicated. When the relay coil R is energized above its critical voltage, relay switch R₁ is closed to short circuit variable resistance 54 and charge condenser 43 at line voltage, relay switch R₂ is closed and the film drive control circuit is completed so that the clutch assembly of the advancing means causes film to move in the copying camera and relay switch R₃ is closed, thus energizing the intermediate circuit and relay coil X which in turn closes relay switches X₁ and X₂ to short circuit document-operated switch 72 and heating resistances 70 and 80 of the illuminating circuits for the lamps illuminating the document field and the indicia of the identifying assembly.

When the trailing edge of the document leaves said fingers 35, the document-operated switch of the timing control circuit is moved to its other position and connects condenser 43 for discharge from a uniform voltage across variable resistance 58, and the trailing interval or time for relay coil R to be deenergized corresponds to the time required for the trailing edge of the document to move from its disengagement with fingers 35 of the control member to and through the document field or to the trailing edge thereof. Upon deenergization of relay coil R, relay switch R₁ is opened to reintroduce resistance 54 for the charging cycle, relay switch R₂ is opened to interrupt the film drive control circuit, and relay switch R₃ is opened to interrupt the intermediate circuit. But relay switch R₃ does not directly interrupt the illuminating circuits, and, instead, deenergizes relay coil X which, in turn, opens relay switches X₁ and X₂ to interrupt the illuminating circuits. This tandem arrangement of relays R and X introduces sufficient lag in interruption of the illuminating circuits so that the clutch assembly has had an opportunity to be disengaged and the film drive is stopped simultaneously with interruption of the illuminating circuits.

Since many variations of the illustrated embodiment of my invention are possible and will be readily recognized by those skilled in the art, the present disclosure is only illustrative and the scope of the invention is defined by the claims which follow.

Having now particularly described my invention what I desire to secure by Letters Patent of the United States and what I claim is:

1. In a photographic copying machine having a document field and a photographic field, the combination with a feeding means for moving a document through said document field, an illuminating means including an incandescent light source and for illuminating said document field, an advancing means including a clutch assembly and for moving a film through said photographic field in synchronism with movement of a document through said document field, and a control member spaced from said document field and responsive to the presence of a document in said feeding means, of a timing control circuit including a document operated switch responsive to said control member, an electrical condenser, and a relay coil in parallel therewith, a film drive control circuit including a solenoid for operating said clutch assembly and a switch operated by said relay coil, and an illumination control means including a light source of said illuminating means, a pair of resistances in series, a second document operated switch responsive to said control members, and a shunt circuit including a switch operated by said relay coil and for short circuiting said second document operated switch and one of said resistances upon energization of said relay coil.

2. In a photographic copying apparatus having a document field and a photographic field, the combination with a feeding means for moving a document through said document field, an advancing means adapted to operate in synchronism with said feeding means and for moving a film through said photographic field, and a control member spaced from said document field and responsive to the presence of a document in said feeding means, of a control circuit responsive to movement of said control member and for controlling said advancing means, and an electrical delayed action means in said circuit, a charging branch circuit connected to said control circuit when a document engages said control member and providing one time interval between movement of said control member by the leading edge of a document and operation of said advancing means, and a discharging branch connected to said control circuit when the document disengages said control member and for providing another time interval between movement of said control member by passage of a trailing edge of a document and inoperativeness of said advancing means.

3. In a photographic copying apparatus having a document field and a photographic field, the combination with a feeding means for moving a document through said document field, an advancing means adapted to operate in synchronism with said feeding means and for moving a film through said photographic field, and a control member spaced from said document field and responsive to the presence of a document in said feeding means, of a control circuit including a document operated switch having two operative positions, moved to one of said positions when the leading edge of a document engages said control member and moved to the other of said positions when the trailing edge of a document passes said control member, and including a relay coil adapted when energized to render said advancing means operative, and an electrical delayed action means in said circuit, energized through said switch in said one position thereof when the leading edge of a document engages said control member and providing one time interval before energization of said relay coil, and deenergized through said switch in its other position after the trailing edge of a document passes said control member and providing a second time interval before deenerization of said relay coil.

4. In a photographic copying apparatus having a document field and a photographic field, the combination with a feeding means for moving a document through said document field, an advancing means adapted to operate in synchronism with said feeding means and for moving a film through said photographic field, and a control member spaced from said document field and responsive to the presence of a document in said feeding means, of a control circuit including a relay coil adapted when energized to render said advancing means operative and an electrical condenser connected to control the voltage applied to said relay coil, and having a charging branch and discharging branch, and a document operated switch having two operative positions, moved to one of said positions when the leading edge of a document engages said control member, connecting said charging branch into said control circuit and for charging said condenser for energization of said relay coil after an interval corresponding to the time for said leading edge of the document to move after engagement with the control member to said document field, and moved to the other of said positions when the trailing edge of a document disengages said control member, connecting said discharging branch into said control circuit and for discharging said condenser for deenergization of said relay coil after an interval corresponding to the time for the trailing edge of a document to move after disengagement with the control member to and through said document field.

5. In a photographic copying apparatus having a document field and a photographic field, the combination with a feeding means for moving a document through said document field, an advancing means adapted to operate in synchronism with said feeding means and for moving a film through said photographic field, and a control member spaced from said document field and responsive to the presence of a document in said feeding means, of a timing circuit including an electrical condenser, a relay coil adapted when energized to cause operation of said advancing means and connected in parallel with said condenser, and a document operated switch moved by engagement of a document with said control member to connect said condenser and relay coil across an electric supply line whereby the voltage across said relay coil is below its critical voltage until said condenser has been charged for a predetermined time corresponding to the time required for the leading edge of a document to move from engagement with said control member to the leading edge of said document field.

6. In a photographic copying apparatus having a document field and a photographic field, the combination with a feeding means for moving a document through said document field, an advancing means adapted to operate in synchronism with said feeding means and for moving a film through said photographic field, and a control member spaced from said document field and responsive to the presence of a document in said feeding means, of a timing circuit including an electrical condenser, a relay coil adapted when energized to cause operation of said advancing means, having a critical energization voltage and connected in parallel with said condenser, a resistance, and a document operated switch assembly moved by engagement of a document with said control member to connect said condenser and relay coil to an electric supply and in series with said resistance whereupon the time required to impress the critical voltage across or to energize said relay coil is determined by the capacity of said condenser and the value of said resistance.

7. In a photographic copying apparatus having a document field and a photographic field, the combination with a feeding means for moving a document through said document field, an advancing means adapted to operate in synchronism with said feeding means and for moving a film through said photographic field, and a control member spaced from said document field and responsive to the presence of a document in said feeding means, of a timing control circuit including an electrical condenser, a relay coil adapted when energized to render said advancing means operative and connected in parallel with said condenser, a pair of resistances, a document operated switch assembly moved by engagement of a document with said control member to connect said condenser and relay coil to an electric supply line in series with one of said resistances and moved by disengagement of a document from said control member to disconnect said condenser and relay coil from said supply line and to connect them across the other of said resistances, and a shunt circuit including a switch closed by energization of said relay coil and for short-circuiting said one resistance.

8. In a photographic copying apparatus having a document field and a photographic field, the combination with a feeding means for moving a document through said document field, an advancing means including a clutch assembly and for moving a film through said photographic field in synchronism with movement of a document through said document field, and a control member spaced from said document field and responsive to the presence of a document in said feeding means, of a timing circuit having a charging branch and a discharging branch and including a condenser and a relay coil in parallel and including a switch movable to either of two positions by said control member for connecting said charging branch to said circuit in one position and said discharging branch to said circuit in the other position and for providing different timing intervals in each position thereof, and a film drive control circuit including a switch operated by said relay coil and a solenoid adapted when energized to render the clutch assembly of said advacing means operative.

9. In a photographic copying apparatus having a document field and a photographic field, the combination with a feeding means for moving a document through said document field, an advancing means including a magnetic clutch assembly and for moving a film through said photographic field in synchronism with movement of a document through said document field, and a control member spaced from said document field and responsive to the presence of a document in said feeding means, of a timing control circuit including a condenser and a relay coil in parallel and including a switch operated by said control member to connect said circuit for charging said condenser and effectively energizing said coil after an interval corresponding to the time for the leading edge of a document to move from engagement of said control member to the leading edge of said document field, and a film drive control circuit including the solenoid of said magnetic clutch assembly and a switch closed by energization of said coil.

10. In a photographic copying apparatus having a document field, the combination with a feeding means for moving a document through said document field, an illuminating means including a light source and for illuminating a document in said document field, and a control member spaced from said document field and responsive to the presence of a document in said feeding means, of a document responsive timing circuit including an electrical delayed action means and a relay coil, and an illumination circuit including said light source, including a switch closed by said relay coil after an interval determined by said delayed action means and corresponding to the time required for the leading edge of a document to move after its operation of said control member to the leading edge of said document field, said switch being interrupted after a second interval determined by said delayed action means and corresponding to the time required for the trailing edge of a document to move after disengaging said control member to and through said document field.

11. In a photographic copying apparatus having a document field, the combination with a feeding means for moving a document through said document field, an illuminating means including a light source and for illuminating a document in said document field, and a control member spaced from said document field and responsive to the presence of a document in said feeding means, of a timing control circuit controlling energization of said illuminating means and including an electrical condenser, a relay coil in parallel therewith, and a switch operated by said control member, adapted when a document engages said control member, to connect said condenser for charging, and an illumination circuit including said light source and a switch adapted to be closed by said relay coil at an interval corresponding to the time for said condenser to charge and for the leading edge of a document to move after engagement with said control member to the leading edge of said document field.

12. In a photographic copying apparatus having a document field and a photographic field, the combination with a feeding means for moving the document through said document field, an illuminating means including an incandescent light source and for illuminating said document field, and a control member spaced from said document field and responsive to the presence of a document in said feeding means, of a document responsive timing circuit including an electrical delayed action means and a relay coil which is adapted to be energized after an interval corresponding to the time for the leading edge of a document to move from engagement with said control member to the leading edge of said document field, an illuminating circuit including a switch operated by said relay coil and completed to said light source after an interval, and a preliminary illumination control circuit including a switch operated by said control member and a resistance and for energizing said light source below incandescence during said interval.

13. In a photographic copying apparatus having a copy field and a photographic field, the combination with a feeding means for moving a document through said copy field, an identifying assembly including indicia also in said copy field, an illuminating means including light sources for illuminating said copy field, and a control member spaced from said copy field and responsive to the presence of a document in said feeding means, of a document responsive timing circuit including an electrical condenser and a relay coil adapted to be energized after an interval corresponding to the time for the leading edge of a document to move from engagement with said control member to the leading edge of said copy field, a preliminary illuminating circuit including a switch closed by said control member when a document engages the same and including a resistance for reducing the energization of said illuminating means during said interval, and an illuminating circuit including a switch responsive to energization of said relay coil and for shunting said preliminary illuminating circuit immediately after said interval.

14. In a photographic copying apparatus having a document field and a photographic field, the combination with a feeding means for moving a document through said document field, an identifying assembly including indicia for forming an image in said photographic field, an illuminating means including light sources for illuminating said document field and said indicia, and a control member spaced from said document field and responsive to the presence of a document in said feeding means, of a timing control circuit including an electrical condenser, a relay coil connected in parallel with said condenser, and a document operated switch assembly moved by engagement of a document with said control member to connect said condenser for charging and delayed energization of said relay coil, and an illumination control means including a switch responsive to movement of said control member, said light sources of the illuminating means, a pair of resistances for reducing the energization of said light sources and a pair of shunt circuits each including a switch member adapted to be closed by energization of said relay coil and to short-circu't said resistances for normal energization of said light sources.

15. In a photographic copying apparatus having a copy field and a photographic field, the combination with a feeding means for moving a document through said copy field, an advancing means including a clutch assembly and for moving a film through said photographic field in synchronism with document movement, an illuminating means including a light source for illuminating said copy field, and a control member spaced from said copy field and responsive to the presence of a document in said feeding means, of a film drive circuit for controlling the clutch assembly of said advancing means, an illumination circuit for energizing said light source, a timing control circuit for rendering said film drive and document illumination circuits operative and inoperative, and an intermediate means between said timing control circuit and said document illumination circuit for delaying deenergization of the latter until after the film drive circuit is deenergized and said clutch assembly is disengaged.

16. In a photographic copying apparatus having a copy field and a photographic field, the combination with a feeding means for moving a document through said copy field, an advancing means including a clutch assembly and for moving a film through said photographic field in synchronism with document movement, an illuminating means including a light source for illuminating said copy field, and a control member spaced from said copy field and responsive to the presence of a document in said feeding means, of a film drive circuit including a switch and a solenoid energized and deenergized for engagement and disengagement of said clutch assembly, an illumination circuit for energizing said light source and including a switch for interrupting said illumination circuit, a timing control circuit responsive to said control member, including a relay coil for controlling energization and deenergization of said film drive and illumination circuits, and an intermediate circuit including a switch operated by said relay coil and including a second relay coil deenergized when the first-mentioned relay coil is deenergized whereupon said switch in the illumination control circuit is opened after opening of the switch in said film drive control circuit.

17. In a photographic copying apparatus having a document field and a photographic field, the combination with a feeding means for moving a document through said document field, an illuminating means including an incandescent light source a_d for illuminating said documment field, and a control member spaced from said document field and responsive to the presence of a document in said feeding means, of a pre-illumination circuit responsive to said control member and for energizing said light source below incandescence, an illumination circuit operative to render said pre-illumination circuit ineffective and for energizing said light source to incandescence, and an interval control means initiated by engagement of a document with said control member, providing an interval corresponding to the time for the leading edge of a document to move from engagement with said control member to the leading edge of said document field, and then at the end of said interval rendering said illumination circuit operative.

18. In a photographic copying machine having a document field and a photographic field, the combination with a feeding means for moving a document through said document field, an advancing means adapted to operate in synchronism with said feeding means and for moving a film through said photographic field, a clutch means between said feeding means and advancing means and upon engagement connecting one to the other, an illuminating means including an incandescent light source and for illuminating said document field, and a control member located ahead of said document field in the direction of document movement and responsive to the presence of a document in said feeding means, of an interval control means initiated by said control member upon engagement of a document therewith, providing an interval corresponding to the time for the leading edge of a document to move from engagement with said control member to the leading edge of said document field, and operative at the end of said interval to cause engagement of said clutch means, a pre-illumination circuit responsive to said control member and for energizing said light source below incandescence during said interval, and a document illumination circuit responsive to said interval control means at the end of said interval and for energizing the pre-energized light source to incandescence immediately.

JOHN F. EGAN.